United States Patent
Bryson et al.

(10) Patent No.: US 11,542,129 B2
(45) Date of Patent: Jan. 3, 2023

(54) DUAL BUS AND HARDWIRE ARCHITECTURE FOR HIGH RELIABILITY CONTROL OF HELICOPTER HOIST

(71) Applicant: GOODRICH CORPORATION, Charlotte, NC (US)

(72) Inventors: Richard Bryson, Yorba Linda, CA (US); Owen Riehle, Orange, CA (US); Alan F. Leingang, Orange, CA (US)

(73) Assignee: Goodrich Corporation, Charlotte, NC (US)

( * ) Notice: Subject to any disclaimer, the term of this patent is extended or adjusted under 35 U.S.C. 154(b) by 877 days.

(21) Appl. No.: 16/436,367

(22) Filed: Jun. 10, 2019

(65) Prior Publication Data

US 2020/0385243 A1 Dec. 10, 2020

(51) Int. Cl.
*B66C 23/18* (2006.01)
*B64D 1/22* (2006.01)
*B66D 1/60* (2006.01)
*G06F 13/20* (2006.01)

(52) U.S. Cl.
CPC ............... *B66C 23/18* (2013.01); *B64D 1/22* (2013.01); *B66D 1/60* (2013.01); *G06F 13/20* (2013.01)

(58) Field of Classification Search
CPC ........... B66C 23/18; B66C 13/40; B64D 1/22; B66D 1/60; B66D 1/46; B66D 1/54; G06F 13/20; B64C 27/04
See application file for complete search history.

(56) References Cited

U.S. PATENT DOCUMENTS

| | | | | |
|---|---|---|---|---|
| 3,810,671 A | * | 5/1974 | Jeffery | B64D 1/22 294/82.32 |
| 8,590,841 B1 | * | 11/2013 | Hall | B66C 23/20 244/137.1 |
| 10,071,493 B2 | * | 9/2018 | Povroznik, III | B64D 1/22 |
| 2013/0154319 A1 | * | 6/2013 | Nouvel | B64C 19/00 297/217.3 |
| 2018/0244509 A1 | * | 8/2018 | Curran | B64D 1/08 |
| 2018/0282130 A1 | * | 10/2018 | Kale | B66C 13/063 |
| 2020/0385250 A1 | * | 12/2020 | Bryson | H04L 12/40182 |

FOREIGN PATENT DOCUMENTS

| | | | |
|---|---|---|---|
| EP | 3070045 | | 9/2016 |
| EP | 3070045 A1 | * | 9/2016 |
| KR | 20200002459 A | * | 8/2020 |

OTHER PUBLICATIONS

Translation of KR20200002459A (Year: 2020).*
European Patent Office, European Search Report dated Jul. 15, 2020 in Application No. 19216334.3.

(Continued)

*Primary Examiner* — Frederick M Brushaber
(74) *Attorney, Agent, or Firm* — Snell & Wilmer L.L.P.

(57) ABSTRACT

A control system for a component of a rescue hoist attached to an aircraft is disclosed. In various embodiments, the control system includes a first bus extending between a control module of the rescue hoist and a control input device; a second bus extending between the control module of the rescue hoist and the control input device; and a hardwire extending between the control module of the rescue hoist and the control input device.

6 Claims, 4 Drawing Sheets

(56) References Cited

OTHER PUBLICATIONS

N J 08405 et al: "DOT/FAA/CT-86/44 4 Digital System Bus Integrity—FAA Technical Center Atlantic City International Airport—IASA-CR-18IU46) Digital SYSTBH Bus M88-I 0 0 3 3", Mar. 31, 1987 (Mar. 31, 1987), XP055712310, Retrieved from the Internet: URL:https://ntrs.nasa.gov/archive/nasa/cas i.ntrs.nasa.gov/19880000648.pdf[retrieved on Jul. 7, 2020].
European Patent Office, European Office Action dated May 19, 2022 in Application No. 19216334.3.

* cited by examiner

DUAL BUS AND HARDWIRE ARCHITECTURE FOR HIGH RELIABILITY CONTROL OF HELICOPTER HOIST

FIELD

The present disclosure relates generally to hoists and, more particularly, to hoists used with rescue aircraft.

BACKGROUND

Hoists used in rescue or similar operations typically wind or unwind a cable in order to raise or lower persons or cargo from a flying platform. For example, a rescue hoist may be mounted to a frame or support structure of an aircraft, such as, for example, a helicopter. The rescue hoist may include a cable drum to which the cable is attached. The cable drum rotates in one direction to spool the cable onto the drum and in the other direction to spool the cable off the drum, with one end of the cable attached to the cable drum and the other end, which may include a hook or other device, freely deployed. The hoist typically includes a gear reduction mechanism disposed between a motor and the cable drum to provide a desired rotational speed of the cable drum during operation. The gear reduction mechanism typically includes several shafts arranged to induce large torques or radial loads, thus necessitating robust bearings and other supporting components within the hoist. A load brake or clutch may be incorporated into the hoist to control operation of the cable drum during the raising or lowering of loads via the cable.

Certifying authorities typically expect control systems used to operate rescue hoists on aircraft possess a quality assurance level sufficient to guarantee safety of the aircraft and the personnel operating the aircraft. One standard and well-recognized quality assurance level is often referred to as Design Assurance Level ("DAL"). Current specifications relating to the DAL level of the control systems used in aircraft are provided in RTCA DO178C (USA) ("*Software Considerations in Airborne Systems and Equipment Certification*," dated Dec. 13, 2011) or ED-12C (the European equivalent of DO178C). The DAL level specifications for the control systems used to operate a rescue hoist are typically considered to fall within the DAL-B category, which specifies the rescue hoist be generally safe from failures that have a potential for negatively impacting the safety or performance of the aircraft or for reducing the ability of the crew to operate the aircraft. However, certain sub-systems of a rescue hoist, such as, for example, a cable-cut mechanism, are subject to the more stringent DAL-A standard, while other subsystems, such as, for example, data storage devices, are subject to the less stringent DAL-C standard.

SUMMARY

A control system for a component of a rescue hoist attached to an aircraft is disclosed. In various embodiments, the control system includes a first bus extending between a control module of the rescue hoist and a control input device; a second bus extending between the control module of the rescue hoist and the control input device; and a hardwire extending between the control module of the rescue hoist and the control input device. The first bus is configured to transmit a first signal from the control input device to the control module, the second bus is configured to transmit a second signal from the control input device to the control module and the hardwire is configured to transmit a third signal from the control input device to the control module, each of the first signal, the second signal and the third signal being generated by the control input device in response to a manipulation of the control input device.

In various embodiments, the control module is configured to compare the first signal and the second signal against the third signal. In various embodiments, the control module is configured to respond to a command signal generated by the control input device, the command signal embodied in the first signal, the second signal and the third signal, when the control module determines the first signal is the same as the second signal and the third signal is consistent with the first signal and the second signal. In various embodiments, the control module is configured to not respond to the command signal generated by the control input device when the control module determines the first signal is not the same as the second signal or the third signal is not consistent with the first signal or the second signal.

In various embodiments, the first bus comprises one of a first CAN-Bus or a first ARINC429-Bus and defines a DAL-C level of reliability. In various embodiments, the second bus comprises one of a second CAN-Bus or a second ARINC429-Bus and defines the DAL-C level of reliability. In various embodiments, the control system defines a DAL-A level of reliability. In various embodiments, the component is a cable cutter. In various embodiments, a storage device is coupled to the control module via a third bus and configured to store a command signal generated by the control input device, the command signal embodied in the first signal and the second signal.

A rescue system for an aircraft is disclosed. In various embodiments, the rescue system includes a rescue hoist having a cable cutter; a control input device configured to provide a command signal to the rescue hoist; a first bus extending between a control module of the rescue hoist and the control input device; a second bus extending between the control module of the rescue hoist and the control input device; and a hardwire extending between the control module of the rescue hoist and the control input device. The first bus is configured to transmit a first signal from the control input device to the control module, the second bus is configured to transmit a second signal from the control input device to the control module and the hardwire is configured to transmit a third signal from the control input device to the control module, each of the first signal, the second signal and the third signal being generated by the control input device in response to a manipulation of the control input device.

In various embodiments, the control module is configured to compare the first signal and the second signal against the third signal. In various embodiments, the control module is configured to activate the cable cutter in response to the command signal, the command signal embodied in the first signal, the second signal and the third signal, when the control module determines the first signal is the same as the second signal and the third signal is consistent with the first signal and the second signal. In various embodiments, the control module is configured to not respond to the command signal when the control module determines the first signal is not the same as the second signal or the third signal is not consistent with the first signal or the second signal.

In various embodiments, the first bus defines a DAL-C level of reliability and the second bus defines the DAL-C level of reliability. In various embodiments, a control system comprising the first bus, the second bus and the hardwire defines a DAL-A level of reliability. In various embodiments, a storage device is coupled to the control module via a third bus and configured to store the command signal.

A method of controlling a component of a rescue hoist for an aircraft is disclosed. In various embodiments, the method includes the steps of: transmitting a first signal across a first bus extending between a control module of the rescue hoist and a control input device; transmitting a second signal across a second bus extending between the control module of the rescue hoist and the control input device; transmitting a third signal across a hardwire extending between the control module of the rescue hoist and the control input device; comparing the first signal against the second signal to determine whether the first signal is the same as the second signal; and comparing the third signal against the first signal and the second signal to determine whether the third signal is consistent with the first signal and the second signal.

In various embodiments, the control module is configured to activate the component in response to a command signal, the command signal embodied in the first signal, the second signal and the third signal, when the control module determines the first signal is the same as the second signal and the third signal is consistent with the first signal and the second signal. In various embodiments, the control module is configured to not respond to the command signal generated by the control input device when the control module determines the first signal is not the same as the second signal or the third signal is not consistent with the first signal or the second signal.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include perma-nent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
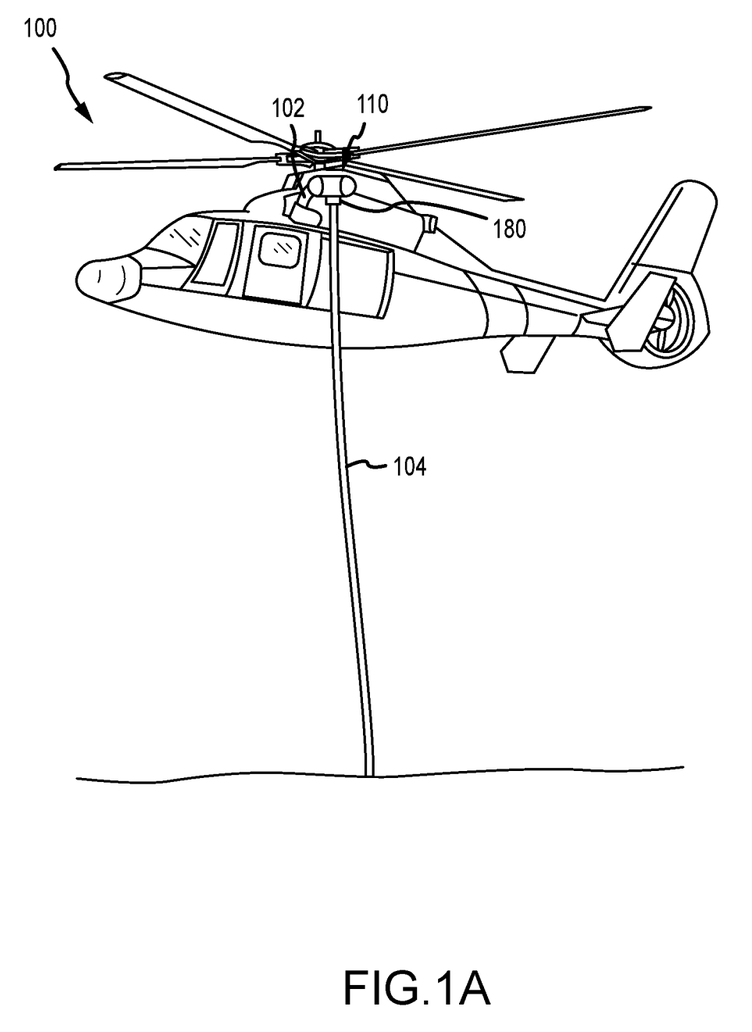
FIG. 1A is an elevation view of an aircraft and a hoist, in accordance with various embodiments.
Figure 1B:
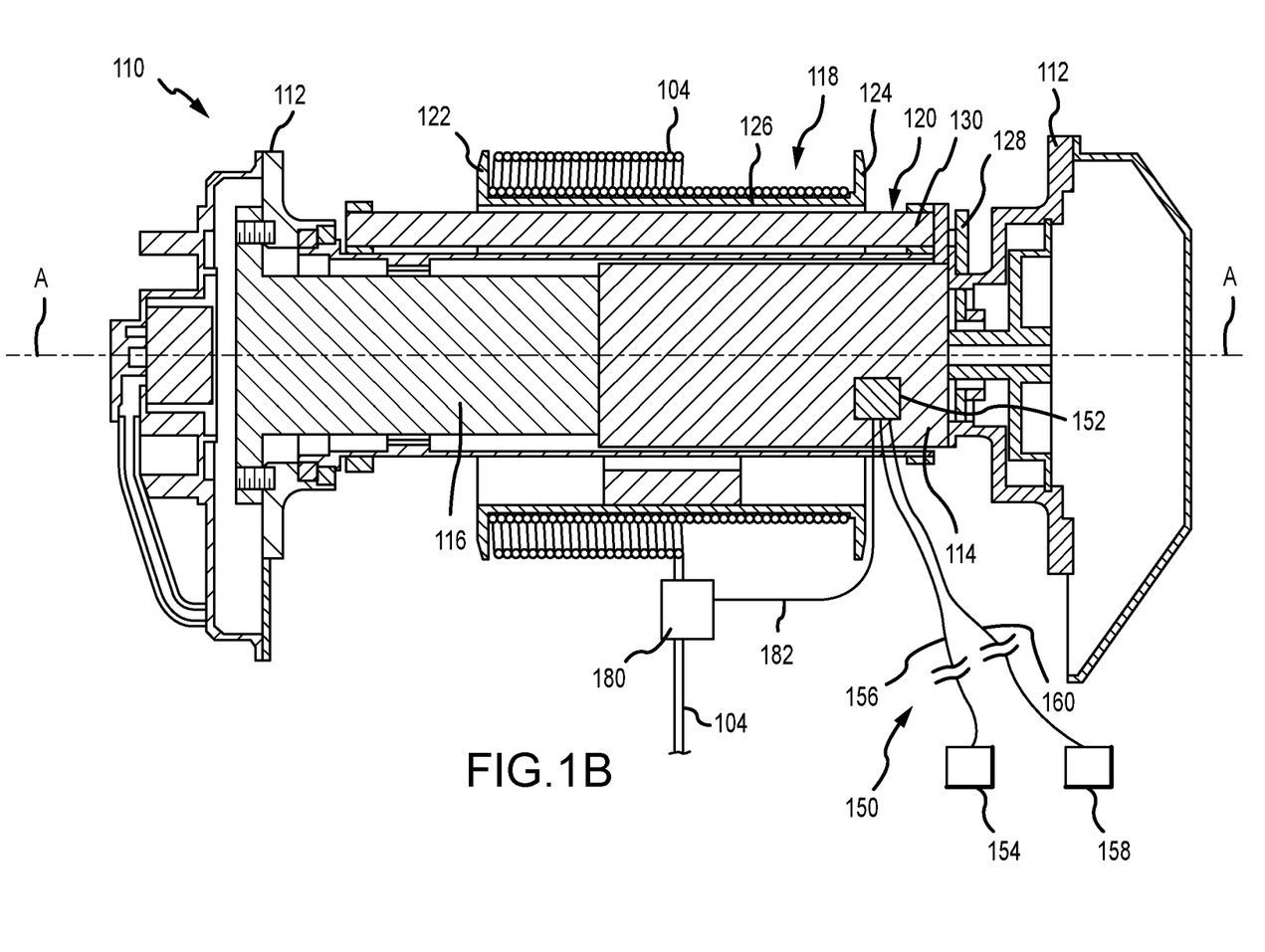
FIG. 1B is a cross-sectional view of a hoist, in accordance with various embodiments.

Referring now to the drawings, FIG. 1A provides a perspective view of an aircraft 100 and a rescue hoist 110 mounted to the aircraft 100, while FIG. 1B provides a cross-sectional view of the rescue hoist 110, in accordance with various embodiments. The rescue hoist 110 is mounted to the aircraft 100 by a support frame 102 and a cable 104 extends from the rescue hoist 110. In various embodiments, the rescue hoist 110 includes a cable cutter 180 configured to cut the cable 104 in the event of an emergency endangering the aircraft 100 or personnel within the aircraft 100 or on the ground. Referring more specifically to FIG. 1B, in various embodiments, the rescue hoist 110 includes a hoist frame 112, a motor 114, a drive train 116, a cable drum 118, a level wind mechanism 120 and a cable cutter 180 (or a similar mission-critical component). The cable drum 118 includes a first flange 122, a second flange 124 and a barrel 126. The barrel 126 extends between and connects the first flange 122 and the second flange 124. The level wind mechanism 120 includes a level wind gear 128 and a screw 130. The cable 104 extends from the rescue hoist 110 and is configured to raise and lower objects to and from the aircraft 100. The motor 114 is connected to the hoist frame 112 and is configured to operate the drive train 116, which is configured to transmit rotational power from the motor 114 to the cable drum 118. The level wind mechanism 120 extends through the cable drum 118 and is configured to wind or unwind the cable 104 onto or from the barrel 126 in orderly fashion between the first flange 122 and the second flange 124 by translating the cable drum 118 back and forth along a direction defined by a longitudinal axis A via the screw 130. The cable cutter 180, in various embodiments, is mounted to the hoist frame 112 and configured to cut or otherwise separate the cable 104 from the rescue hoist 110.

Referring still to FIG. 1B, the rescue hoist 110 further includes a control system 150 configured to control operation of the rescue hoist 110. In various embodiments, the control system 150 is coupled to a control module 152, which is connected to a control input device 154 (or a plurality of control input devices) via a control bus 156. The control module 152, which in various embodiments may be considered a component of the rescue hoist 110, includes circuitry configured to control operation of the rescue hoist 110 in response to inputs (or signals) received from the control input device 154. In various embodiments, the control module 152 is also coupled to a storage device 158 via a storage bus 160, with the storage device 158 configured to store data reflecting a record of all the control inputs received by the control module 152, and to the cable cutter 180 via a cutter bus 182. As described further below, in various embodiments, the control bus 156 and the storage bus 160 may comprise, for example, a Controller Area Network ("CAN-Bus"), a Mark 33 Digital Information Transfer System ("ARINC429-Bus") or a similar network system or bus. In various embodiments, for example, the control bus 156 comprises a Dual CAN Bus—e.g., a first controller area network bus ("a first CAN-Bus") and a second controller area network bus ("a second CAN- Bus")—that is configured to provide a DAL-B level of reliability in operation of the rescue hoist 110, while the storage bus 160 comprises a Single CAN-Bus—e.g., a third controller area network bus ("a third CAN-Bus")—configured to provide a DAL-C level of reliability in operation of the storage device 158. Similarly, in various embodiments, the control bus 156 comprises a Dual ARINC429-Bus—e.g., a first ARINC429 bus ("a first ARINC429-Bus") and a second ARINC429 bus ("a second ARINC429-Bus")—that is configured to provide a DAL B level of reliability in operation of the rescue hoist 110, while the storage bus 160 comprises a Single ARINC429-Bus—e.g., a third ARINC429 bus ("a third ARINC429-Bus")—configured to provide a DAL C level of reliability in operation of the storage device 158. For simplicity, in the discussion that follows, the Dual CAN-Bus and the Dual ARINC429-Bus may be referred to interchangeably as a "Dual-Bus," typically comprising a "first-Bus" (or a first bus) and a "second-Bus" (or a second bus), while the Single CAN-Bus and the Single ARINC429-Bus may be referred to interchangeably as a "Single-Bus," typically comprising a "third-Bus" (or a third bus). Further, in various embodiments, the control bus 156 additionally includes a hardwire (e.g., a copper or metallic wire or cable or the like) that runs together with the first-Bus and the second-Bus, the combination of which provides a DAL-A level of reliability in operation of the cable cutter 180.

Language describing the various Design Assurance Levels ("DAL") discussed in this this disclosure are set forth in Federal Aviation Administration Advisory Circular AC29-C2 and summarized as follows:

| | |
|---|---|
| DAL A | Catastrophic - Failure may cause deaths, usually with loss of the airplane. |
| DAL B | Hazardous - Failure has a large negative impact on safety or performance, or reduces the ability of the crew to operate the aircraft due to physical distress or a higher workload, or causes serious or fatal injuries among the passengers. |
| DAL C | Major - Failure significantly reduces the safety margin or significantly increases crew workload. May result in passenger discomfort (or even minor injuries). |
| DAL D | Minor - Failure slightly reduces the safety margin or slightly increases crew workload. Examples might include causing passenger inconvenience or a routine flight plan change. |
| DAL E | No Effect - Failure has no impact on safety, aircraft operation, or crew workload. |

Additional details of the control bus 156 and the storage bus 160 and the DAL:standards or levels of reliability they enable are provided in the following discussion.

Figure 2:
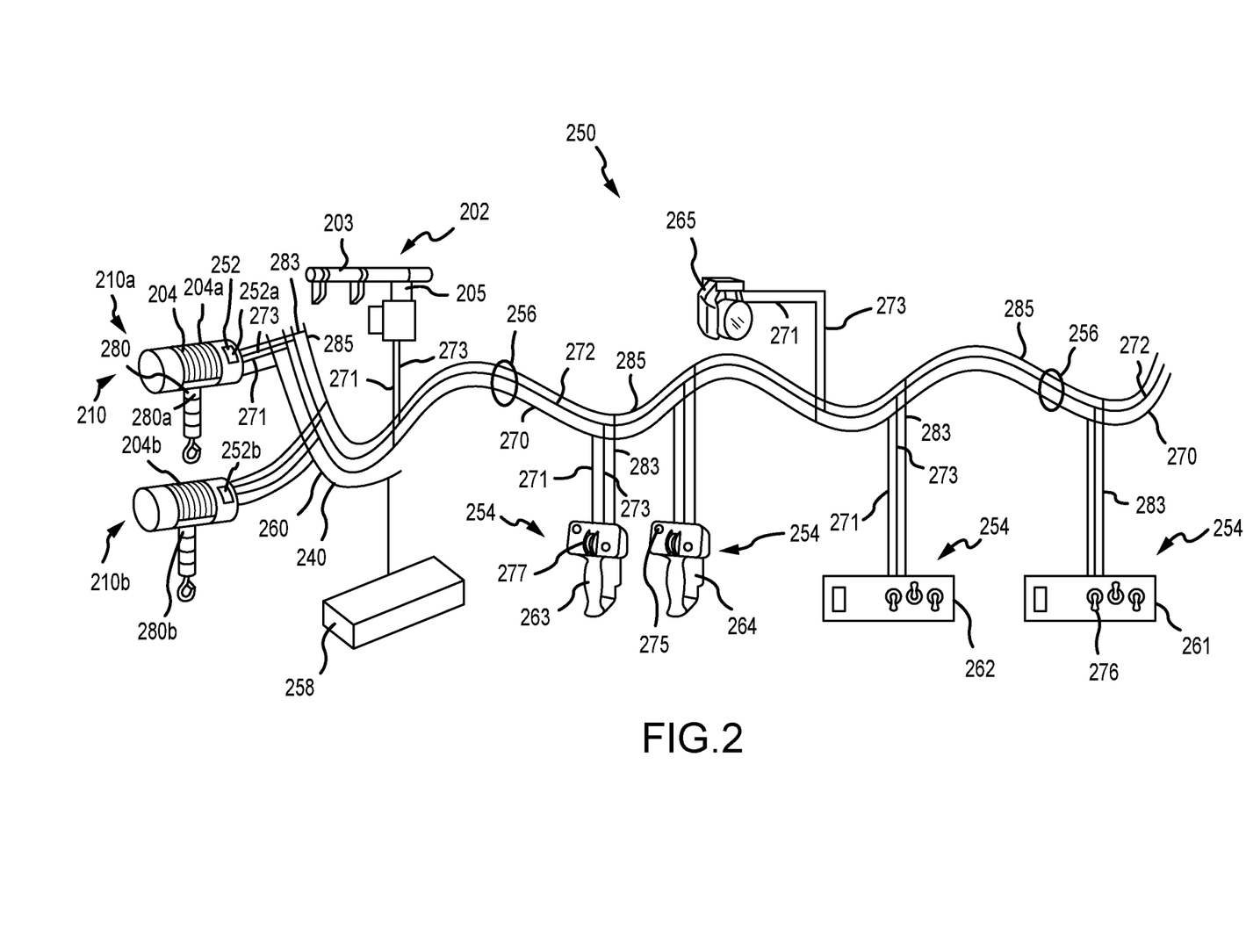
FIG. 2 is a schematic diagram of a control system for a hoist, in accordance with various embodiments.

Referring now to FIG. 2, a control system 250 is illustrated, the control system being, in various embodiments, part of a rescue system for an aircraft. The control system 250 is similar to the control system 150 described above with reference to FIG. 1B and configured to control operation of a first rescue hoist 210*a* and, in various embodiments, a second rescue hoist 210*b*, both of which are similar to the rescue hoist 110 described above with reference to FIGS. 1A and 1B. In various embodiments, one or both of the first rescue hoist 210*a* and the second rescue hoist 210*b* are configured for attachment to a support frame 202, similar to the support frame 102 described above with reference to FIG. 1A. The first rescue hoist 210*a* is operable to raise and lower a first cable 204*a* and includes a first control module 252*a*. Similarly, the second rescue hoist 210*b* is operable to raise and lower a second cable 204*b* and includes a second control module 252*b*. In various embodiments, the first rescue hoist 210*a* includes a first cable cutter 280*a* and the second rescue hoist includes a second cable cutter 280*b*. For simplicity, the control system 250 is described below as configured to operate a rescue hoist 210 as a single unit, comprising a cable 204, a cable cutter 280 and a control module 252, each of which is similar to the like-named components described above with reference to FIGS. 1A and 1B, rather than describe operation of both the first rescue hoist 210*a* and the second rescue hoist 210*b* and their related components just described.

Still referring to FIG. 2, in various embodiments, the control system 250 includes a control bus 256, similar to the control bus 156 described above with reference to FIG. 1B. The control bus 256 is configured to transmit control signals, bidirectionally, between a control input device 254, similar to the control input device 154 described above with reference to FIG. 1B, and the control module 252 connected to the rescue hoist 210. In various embodiments, the control input device 254 includes one or more of a pilot panel 261, a cabin panel 262, an operator pendant 263 and a trainee pendant 264. Generally, each of the foregoing embodiments of the control input device 254 includes one or more input mechanisms—e.g., a push button 275, a toggle switch 276 or a thumb wheel 277—configured to control operation of the rescue hoist 210. For example, the one or more input mechanisms—e.g., the push button 275 or the toggle switch 276—may be configured to raise or lower the cable 204 or to stop or start raising or lowering the cable 204. Likewise, in various embodiments, each of the foregoing embodiments of the control input device 254 includes input mechanisms configured to control operation of the support frame 202, which operation may include activating a motor disposed within or proximate the support frame 202 to rotate a support frame arm 203 in a clockwise or counterclockwise direction with respect to a support frame post 205. In various embodiments, one or both of the first rescue hoist 210*a* and the second rescue hoist 210*b* are secured to the support frame 202 or the support frame arm 203.

In various embodiments, the control bus 256 comprises a first-Bus 270 and a second-Bus 272, each of which is configured to couple together the rescue hoist 210 (or the control module 252), the support frame 202 and the control input device 254, including one or more of the pilot panel 261, the cabin panel 262, the operator pendant 263 and the trainee pendant 264. Further, in various embodiments, the control bus 256 comprises an analog bus 285—e.g., a copper wire—that couples together the rescue hoist 210 (or the control module 252) and the control input device 254 and is configured, as explained further below, to take part in control of the cable cutter 280. In various embodiments, the first-Bus 270 and the second-Bus 272 operate using a common protocol, thereby enabling a component to be plugged into the control bus 256 without the need for separate wire runs from the component to, for example, the control module 252 or the control input device 254. For example, a searchlight 265 may be incorporated into the control system 250 by connecting the searchlight 265 to the first-Bus 270 via a first stub 271 and to the second-Bus 272 via a second stub 273. Similarly, each of the rescue hoist 210, the support frame 202 and the control input device 254 may be connected to the first-Bus 270 via a first stub 271 and to the second-Bus 272 via a second stub 273. In various embodiments, the analog bus 285 may be connected to the various components—e.g., the rescue hoist 210 (or the control module 252) and the control input device 254—via a third stub 283.

Still referring to FIG. 2, the control system 250 further includes or is coupled to a storage device 258, which may comprise componentry typically found in a flight recorder device. In various embodiments, the storage device 258 is coupled to the control module 252 via a storage bus 260, which may comprise a third-Bus 240, similar to either the first-Bus 270 or the second-Bus 272 described above. In various embodiments, the storage device 258 and the storage bus 260 are similar to the storage device 158 and the storage bus 160 described above with reference to FIG. 1B. In various embodiments, the storage device 258 is configured to store data reflecting a record of all the control inputs (or signals) received by the control module 252 via the control input device 254, including one or more of the pilot panel 261, the cabin panel 262, the operator pendant 263 and the trainee pendant 264. Typically, the storage device 258 is configured to receive data only, thus the third-Bus 240 may be configured to provide unidirectional transmission of data only, though the disclosure contemplates bidirectional transmission of data, such that operability of the storage device 258 may be reported to an operator of the aircraft—e.g., by displaying a status signal on the pilot panel 261 or the cabin panel 262.

During operation, the control system 250 is configured to provide either two or three inputs (or two or three sets of data or signal inputs) to the control module 252 based on the inputs sent by the control input device 254 in response to a manipulation (e.g., operation of the push button 275, the toggle switch 276 or the thumb wheel 277). More specifically, during control of the hoist functions other than the cable cutter 280, two inputs or signals are transmitted along the control bus 256 to the control module 252. A first signal is transmitted on the first-Bus 270 and a second signal is transmitted on the second-Bus 272. In various embodiments, upon receipt of the two signals by the control module 252, the control module 252 will compare the two signals and direct the rescue hoist 210 to either respond accordingly or take no action. For example, the pilot panel 261 may be manipulated—e.g., via the push button 275—to command the rescue hoist 210 to raise the cable 204 by directing an appropriate command signal to the control module 252. The command signal is transmitted to the control module 252 via a first signal on the first-Bus 270 and via a second signal on the second-Bus 272. The control module 252 compares the first signal against the second signal. If the first signal and the second signal both correspond to the same command—e.g., to raise the cable 204—then the control module 252 directs the rescue hoist 210 to raise the cable 204. On the other hand, if the control module 252 determines the first signal and the second signal both do not correspond to the same command, then no action is taken by the control module 252.

During operation of the cable cutter 280, on the other hand, three inputs or signals are transmitted along the control bus 256 to the control module 252. Similar to the above description, a first signal is transmitted on the first-Bus 270 and a second signal is transmitted on the second-Bus 272. However, during operation of the cable cutter 280, a third signal is transmitted via the analog bus 285 (e.g., the hardwire) to the control module 252. In various embodiments, the third signal may comprise a voltage difference from a nominal threshold or some similar analog signal, though the disclosure contemplates the third signal comprising digital signals as well. In various embodiments, upon receipt of the first signal and the second signal by the control module 252, the control module 252 will compare the two signals in a fashion similar to the one described above. In the event the two signals do not both indicate a command to activate the cable cutter 280, then no further action is taken. However, in the event both signals indicate the same command to activate the cable cutter 280, the control module 252 initiates a subsequent query. The subsequent query examines the signal carried by the analog bus 285 and determines whether that signal is consistent with the signals to activate the cable cutter 280 received on the first-Bus 270 and the second-Bus 272. If all three signals indicate a command to activate the cable cutter 280, then the cable cutter 280 is activated; otherwise, no further action is taken.

Figure 3:
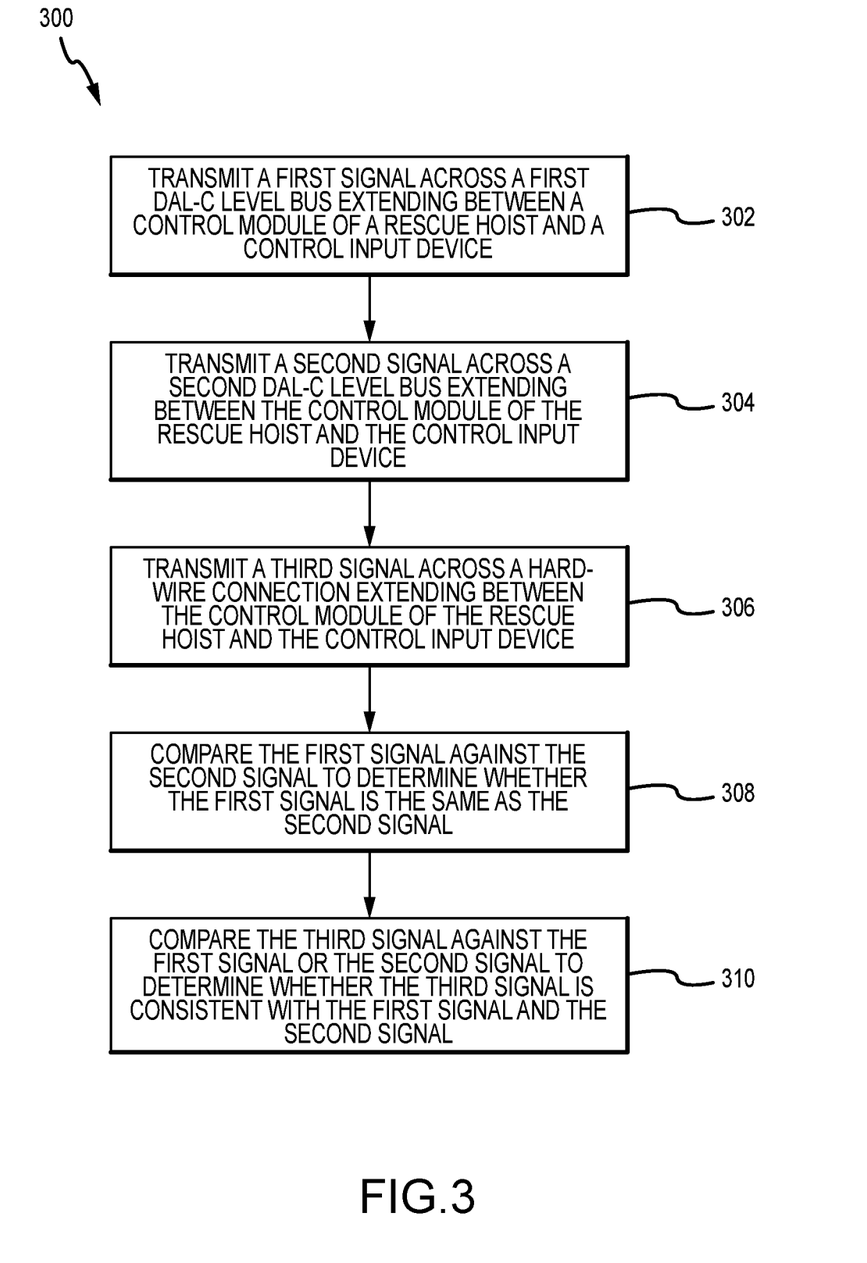
FIG. 3 is a flowchart depicting a method of providing a DAL A level of reliability for a rescue hoist component in an aircraft, in accordance with various embodiments.

Referring now to FIG. 3, a method 300 of controlling a rescue hoist component in an aircraft is described, the method, in various embodiments, providing a DAL-A level of reliability. In various embodiments, a first step 302 includes transmitting a first signal across a first bus extending between a control module of the rescue hoist and a control input device, the first bus, in various embodiments, defining a DAL-C level of reliability. Similarly, a second step 304, generally carried out simultaneously with the first step, includes transmitting a second signal across a second bus extending between the control module of the rescue hoist and the control input device, the second bus, in various embodiments, defining the DAL-C level of reliability. A third step 306 includes transmitting a third signal across a hardwire extending between the control module of the rescue hoist and the control input device. A fourth step 308 includes comparing the first signal against the second signal to determine whether the first signal is the same as the second signal. A fifth step 310 includes comparing the third signal against the first signal or the second signal to determine whether the third signal is consistent with the first signal and the second signal.

In various embodiments, the control module is configured to activate the component in response to a command signal, the command signal embodied in the first signal, the second signal and the third signal, when the control module determines the first signal is the same as the second signal and the third signal is consistent with the first signal and the second signal. In various embodiments, the control module is also configured to not respond to the command signal generated by the control input device in response to the control module determining that the first signal is not the same as the second signal or the third signal is not consistent with the first signal or the second signal.

A Dual-Bus architecture is disclosed per the above description and in accordance with various embodiments. In various embodiments, the operation described above results in a DAL-B level of reliability of all hoist functions, excepting the cable cutter 280 or similar mission critical component, notwithstanding each of the first-Bus 270 and the second-Bus 272 is typically configured to provide DAL-C levels of reliability when operating as standalone buses. When combined with a separate analog or hardwire, the Dual-Bus architecture above described provides a DAL-A level of reliability of the cable cutter 280 (or any other mission critical component wired separately with an analog or hardwire and a first-Bus and a second-Bus). The Dual-Bus architecture provides a DAL-B level of reliability in operation of a rescue hoist with minimal wiring—e.g., by eliminating discrete wiring between the rescue hoist and the various control input devices—thereby saving weight and reducing complexity. The Dual-Bus architecture also provides a standardization in software between components, enabling components to be repaired or replaced as line replaceable units and facilitating integration of control hierarchy into the control system. The Dual-Bus architecture also provides redundancy into the system in the event one of the first-Bus or the second-Bus experiences failure or otherwise becomes compromised.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A control system for a mission-critical component of a rescue hoist attached to an aircraft, comprising:
    a first controller area network bus extending between a control module of the rescue hoist and a plurality of control input devices;
    a second controller area network bus extending between the control module of the rescue hoist and the plurality of control input devices; and
    a hardwire bus extending between the control module of the rescue hoist and the plurality of control input devices;
    wherein the first controller area network bus is configured to transmit a first signal from a first control input device of the plurality of control input devices to the control module, the second controller area network bus is configured to transmit a second signal from a second control input device of the plurality of control input devices to the control module and the hardwire bus is configured to transmit a third signal from a third control input device of the plurality of control input devices to the control module, each of the first signal, the second signal, and the third signal being generated by the first control input device, the second control input device, and the third control input device in response to a manipulation of the first control input device, the second control input device, and the third control input device,
    wherein the control module is configured to compare the first signal and the second signal against the third signal,
    wherein the control module is configured to respond to a command signal for the component generated by the first control input device, the second control input device and the third control input device, the command signal embodied in the first signal, the second signal, and the third signal, in response to the control module determining the first signal from the first control input device is consistent with the second signal from the second control input device and in response to the control module determining the third signal from the third control input device is consistent with the first signal from the first control input device and the second signal from the second control input device, and
    wherein the control module is configured to not respond to the command signal for the component generated by the control input device generated by the first control input device in response to the control module determining the first signal from the first control input device is inconsistent with the second signal from the second control input device or in response to the control module determining the third signal from the third control input device is inconsistent with the first signal from the first control input device or the second signal from the second control input device.

2. The control system of claim 1, wherein the mission-critical component is a cable cutter.

3. The control system of claim 2, further comprising a storage device coupled to the control module via a third controller area network bus and configured to store a command signal generated by the control input device, the command signal embodied in the first signal and the second signal.

4. A rescue system for an aircraft, comprising:
    a rescue hoist having a cable cutter;

a control input device configured to provide a command signal to the rescue hoist;

a first controller area network bus extending between a control module of the rescue hoist and the control input device;

a second controller area network bus extending between the control module of the rescue hoist and the control input device; and a hardwire bus extending between the control module of the rescue hoist and the control input device;

wherein the first controller area network bus is configured to transmit a first signal from a first control input device of the plurality of control input devices to the control module, the second controller area network bus is configured to transmit a second signal from a second control input device of the plurality of control input devices to the control module and the hardwire bus is configured to transmit a third signal from a third control input device of the plurality of control input devices to the control module, each of the first signal, the second signal, and the third signal being generated by the first control input device, the second control input device, and the third control input device in response to a manipulation of the first control input device, the second control input device, and the third control input device, wherein the control module is configured to compare the first signal and the second signal against the third signal, wherein the control module is configured to respond to a command signal for the component generated by the first control input device, the second control input device and the third control input device, the command signal embodied in the first signal, the second signal, and the third signal, in response to the control module determining the first signal from the first control input device is consistent with the second signal from the second control input device and in response to the control module determining the third signal from the third control input device is consistent with the first signal from the first control input device and the second signal from the second control input device, and wherein the control module is configured to not respond to the command signal for the component generated by the control input device generated by the first control input device in response to the control module determining the first signal from the first control input device is inconsistent with the second signal from the second control input device or in response to the control module determining the third signal from the third control input device is inconsistent with the first signal from the first control input device or the second signal from the second control input device.

5. The rescue system of claim 4, further comprising a storage device coupled to the control module via a third controller area network bus and configured to store the command signal.

6. A method of controlling a rescue hoist having a mission critical component in an aircraft, comprising:

transmitting a first signal from a first control input device of a plurality of control input devices across a first controller area network bus extending between a control module of the rescue hoist and the plurality of control input devices;

transmitting a second signal from a second control input device of the plurality of control input devices across a second controller area network bus extending between the control module of the rescue hoist and the plurality of control input devices;

transmitting a third signal from a third control input device of the plurality of control input devices across a hardwire bus extending between the control module of the rescue hoist and the plurality of control input devices;

comparing the first signal from the first control input device against the second signal from the second control input device to determine whether the first signal from the first control input device is the same as the second signal from the second control input device; and comparing the third signal from the third control input device against the first signal from the first control input device and the second signal from the second control input device to determine whether the third signal from the third control input device is consistent with the first signal from the first control input device and the second signal from the second control input device, wherein the control module is configured to activate the component in response to a command signal, the command signal embodied in the first signal from the first control input device, the second signal from the second control input device, and the third signal from the third control input device, in response to the control module determining the first signal from the first control input device is consistent with the second signal from the second control input device and in response to the control module determining the third signal from the third control input device is consistent with the first signal from the first control input device and the second signal from the second control input device, and wherein the control module is configured to not respond to the command signal in response to the control module determining the first signal from the first control input device is inconsistent with the second signal from the second control input device or in response to the control module determining the third signal from the third control input device is inconsistent with the first signal from the first control input device or the second signal from the second control input device.

* * * * *